United States Patent

Ober et al.

[11] Patent Number: 5,248,734
[45] Date of Patent: Sep. 28, 1993

[54] PROCESS FOR PREPARING A POLYPHENYLENE POLYMER

[75] Inventors: Christopher K. Ober, Ithaca, N.Y.; George Barclay, Allston, Mass.; Thomas Mates, Endicott, N.Y.; Hwan-Kyu Kim, Ithaca, N.Y.

[73] Assignee: Cornell Research Foundation, Inc., Ithaca, N.Y.

[21] Appl. No.: 900,815

[22] Filed: Jun. 16, 1992

[51] Int. Cl.5 ............ C08F 8/00; C08F 16/02; C08F 32/06; C08L 45/00
[52] U.S. Cl. .......... 525/328.8; 525/326.1; 525/332.1; 526/308; 528/481; 528/503
[58] Field of Search ............ 528/481, 503; 525/328.8, 326.1, 332.1; 526/308

[56] References Cited

U.S. PATENT DOCUMENTS

| | | | |
|---|---|---|---|
| 4,371,605 | 2/1983 | Renner | 430/414 |
| 4,476,296 | 10/1984 | Ballard et al. | 528/481 |
| 4,524,198 | 6/1985 | Ballard et al. | 526/292.1 |
| 4,536,555 | 8/1985 | Ballard et al. | 526/295 |
| 4,661,429 | 4/1987 | Molaire et al. | 430/70 |
| 4,798,742 | 1/1989 | Ballard et al. | 427/240 |
| 4,849,504 | 7/1989 | Ballard et al. | 528/491 |

FOREIGN PATENT DOCUMENTS 76605 4/1983 European Pat. Off. .
107895 5/1984 European Pat. Off. .

OTHER PUBLICATIONS

CA 116 (22): 215072z "Acid-Catalyzed Photoaromatization of Poly(cyclohexadiene-1,2-diol) Derivatives into Poly(phenylene)", Kim et al.

D. G. H. Ballard, A. Courtis, I. M. Shirley, and S. C. Taylor, "Synthesis of Polyphenylene from a cis-Dihydrocatechol, a Biologically Produced Monomer", Macromolecules 21, 294-304 (1988).

Primary Examiner—John Kight, III
Assistant Examiner—P. Hampton-Hightower
Attorney, Agent, or Firm—Bell, Seltzer, Park & Gibson

[57] ABSTRACT

Polyphenylene is prepared by exposing a poly(1,2-disubstituted-cyclohexa-3,5-diene) precursor to ultraviolet light in the presence of an acid catalyst. The acid catalyst is activated by the ultraviolet radiation and forms polyphenylene by aromatizing the cyclohexene rings of the poly(1,2-disubstituted-cyclohexa-3,5-diene).

28 Claims, 2 Drawing Sheets

PROCESS FOR PREPARING A POLYPHENYLENE POLYMER

FIELD OF THE INVENTION

This invention relates to a process for preparing a polymeric material. More particularly, this invention relates to a process for preparing polyphenylene using a photochemical reaction.

BACKGROUND OF THE INVENTION

Polyphenylene is a polymer comprised of repeating phenyl groups. Polyphenylene has a number of desirable properties, including good near infrared transmission, low dielectric constant, low moisture uptake, thermal and environmental stability, and ease of pattern fabrication using lithographic techniques. Polyphenylene has the potential for a variety of uses in the microelectronics industry, including use as a planarizing material, as an insulator, as an encapsulator, as an interlevel dielectric in a multichip module, and as an optical waveguide, among others.

Various processes for synthesizing polyphenylene have been suggested. One such process is the direct polymerization of benzene, an oxidative cationic polymerization requiring large quantities of cupric chloride ($CuCl_2$) disclosed by Kovacic et al., *J. Polym. Sci.* 47, 448 (1960); Kovacic et al., *Chem. Rev.* 87, 357 (1987); and Brown et al., *J. Polym Sci., Polym. Chem. Ed.* 24, 255 (1986). This technique, however, results in a mixture of 1,2 and 1,4 units plus chemical defects. Further, the products of this reaction are more properly defined as oligomers rather than polymers as the chain lengths are between 10 and 15 phenylene residues. Moreover, it is difficult to completely remove all of the $CuCl_2$.

Yamamoto et al., *Bull. Chem. Soc. Jpn.* 51, 2091 (1978) disclose the polymerization of p-dibromobenzene in the presence of magnesium using a nickel catalyst. However, molecular weight measurements indicate that the growth does not go beyond 10–12 phenylene residues because the polymer separates as a crystalline solid. Thus, further polymerization to a higher molecular weight is difficult or impossible.

Marvel et al., *J. Am. Chem. Soc.* 41, 448 (1959) disclose a process using cyclohexa-1,3-diene in the presence of a Zieglar catalyst. This produces poly(cyclohexene) containing 1,4 and 1,2 unit+s. Aromatization of the polymers was attempted by reaction with bromine followed by pyrolysis to eliminate hydrogen bromide (HBr). The purity of the products are suspect, however, as there are a number of possible bromine-substituted intermediates which would prevent complete aromatization. Additionally, various attempts to produce pure polyphenylene have tended to fail because of the poor solubility of the partially aromatized product. Moreover, the conditions of the aromatization can be severe enough so that the main polymer chain is fractured.

Ballard et al., *Macromolecules* 21, 294–304 (1988) describe the synthesis of 5,6-cis-dihydroxycyclohexa-1,3-diene, the polymerization of its derivatives and the conversion of the polymers formed into polyphenylene. In this reaction, the polyphenylene precursor is prepared from benzene using an organic route employing enzymes to convert benzene to a 1,2-disubstituted-3,5-diene. Polymerization and aromatization is completed by the addition of a radical initiator, such as benzoyl peroxide or azobis(isobutyronitrile) ("AIBN"), and subsequent heating of the solution.

U.S. Pat. No. 4,798,742 discloses a multistep process for preparing polyphenylene wherein a copolycyclohexa-3,4-diene is treated under basic conditions to partially aromatize the polymer and then treated to complete aromatization using heat or ultraviolet light.

Despite the variety of methods available to produce polyphenylene, these techniques can result in an oligomer or low mass polymer. Further, the prior techniques can result in impurities in the final product. The processes are also often complex, requiring multiple steps and harsh solvents, and requiring subsequent processing steps after the polymer is formed.

SUMMARY OF THE INVENTION

It is therefore an object of the present invention to provide an improved process for producing polyphenylene.

It is another object of the present invention to provide an improved process for producing polyphenylene using a photocatalyst to aromatize a polyphenylene precursor.

It is yet another object of the present invention to provide an improved process for producing polyphenylene using a photoacid generator as a photocatalyst to aromatize a polyphenylene precursor in a conversion reaction.

These and other objects are provided according to the present invention by a process for producing polyphenylene polymers. The process comprises exposing a poly(1,2-disubstituted-cyclohexa-3,5-diene) to ultraviolet light in the presence of an acid catalyst. The acid catalyst initiates the aromatization reaction and forms polyphenylene by aromatizing the cyclohexene rings of the poly(1,2-disubstituted-cyclohexa-3,5-diene).

The poly(1,2-disubstituted-cyclohexa-3,5diene) is represented by the formula:

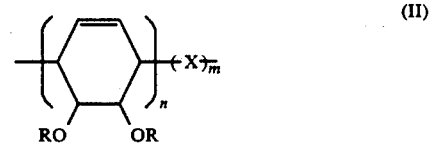

(II)

wherein
  the cyclohexenylene ring and the residue X, where X is present, may vary from unit to unit along the polymer chain;
  each R, which may be the same or different, is hydrogen, a hydrocarbon, e.g., a lower alkyl group having up to five carbon atoms, an aroyl or alkanoyl group having up to ten carbon atoms, or —COOR', wherein R' is an aryl or alkyl group having up to ten carbon atoms, and preferably is an alkanoyl group —$COCH_3$;
  X is a residue of one or more polymerizable comonomers as hereinafter defined; and
  n and m are integers and the ratio of n:m lies in the range of 1:0 to 1:100.

The acid catalyst is selected from the group of acid precursors which generate acid upon exposure to radiation, including diazonium, phosphonium, sulfonium and iodonium salts; halocarbons; benzoin and o-nitrobenzyl esters of strong acids; toluene sulfonic acid; N-hydroxy amide and N-hydroxyimide sulfonates; and aryldiazonium, diaryliodonium and triarylsulfonium metal halides. Thus, the acid catalyst may itself be activated upon exposure to ultraviolet radiation prior to initiating the aromatization reaction.

The invention also provides a process for preparing a microelectronic device. In this embodiment of the invention, a layer of a mixture of the poly(1,2-disubstituted-cyclohexa-3,5-diene) and the acid catalyst is deposited on the surface of a substrate and exposed to ultraviolet light so that the cyclohexene rings of said poly(1,2-disubstituted-cyclohexa-3,5-diene) are aromatized.

Another embodiment of the invention provides a chemical composition suitable as a polyphenylene precursor. The chemical composition comprises a mixture of the acid catalyst and the poly(1,2-disubstituted-cyclohexa-3,5-diene). Yet another embodiment of the invention provides a substrate coated with a chemical composition comprising a mixture of poly(1,2-disubstituted-cyclohexa-3,5-diene) and the salt of a catalyzing acid.

DETAILED DESCRIPTION OF THE INVENTION

Figure 1:
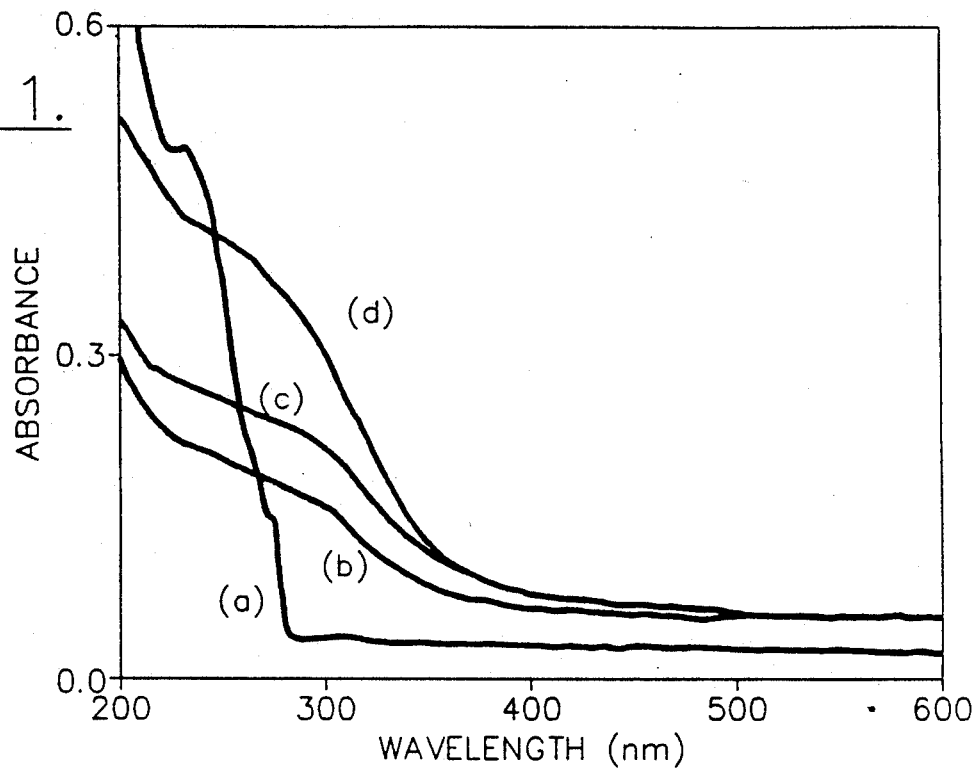
FIG. 1 is an ultraviolet spectrum of polyphenylene obtained from heat-treatment of a diethylcarbonate precursor on a quartz film.

The term "polyphenylene polymers" as used herein has its conventional meaning in the art, i.e., unsaturated cyclic aromatic hydrocarbons comprising repeating phenyl groups. The term "polyphenylene precursor" refers to cyclic precursor monomers employed in the synthesis of polyphenylene in accordance with the present invention as described in more detail below.

Polyphenylene polymers prepared according to the present invention are represented by the formula:

  (I)

wherein
the residues Ar and X, where X is present, may vary from unit to unit in the polymer chain;
Ar represents a divalent aromatic or substituted aromatic group;
X is a residue of one or more polymerizable comonomers as defined below; and
n and m are whole numbers and the ratio of n:m lies in the range of 1:0 to 1:100.

In compounds of formula I, Ar is preferably a phenylene ring. The linkages by which the phenylene rings are bonded in the polymer backbones may be ortho or para to one another. Preferably, the majority of linkages are para.

The polyphenylene precursors of the present invention include 1,2-disubstituted-cyclohexa-3,5-diene homo- or copolymers represented by the formula:

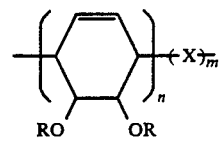  (II)

wherein
the cyclohexenylene ring and the residue X, where X is present, may vary from unit to unit along the polymer chain;
each R, which may be the same or different, is hydrogen, a hydrocarbyl, e.g., a lower alkyl group having up to five carbon atoms, an aroyl or alkanoyl group having up to ten carbon atoms, or —COOR' wherein R' is an aryl or alkyl group having up to ten carbon atoms, and preferably is an alkanoyl group —COCH$_3$;
X is a residue of one or more polymerizable comonomers as hereinafter defined; and
n and m are integers and the ratio of n:m lies in the range of 1:0 to 1:100.

Poly(1,2-disubstituted-cyclohexa-3,5-diene)s according to Formula (II) are known to those skilled in the art and are described U.S. Pat. No. 4,798,742 and European Publication Nos. 76605 and 107,895, the disclosures of which are incorporated entirely herein by reference. Suitable 1,2 substituents which may be present in the process of the invention include esters of alkanoic acids, e.g., acetic, pivalic or oxalic acids, aromatic acids, e.g., benzoic or p-nitrobenzoic or cyclic lactones and carbonates, e.g., 1,2-dialkyl carbonates, 1,2-biscarbonates or thiocarbonates. Illustrative of poly(1,2-disubstituted-cyclohexa-3,5diene)s according to Formula (II) are 1,2-diacetatecyclohexa-3,5-diene and 1,2-dicarbethoxycyclohexa-3,5-diene. In a preferred embodiment, the poly(1,2-disubstituted-cyclohexa-3,5diene) is 1,2-diacetatecyclohexa-3,5-diene.

In the process of the invention, the polyphenylene precursors represented by Formula (II) are converted or aromatized to form polyphenylene by exposing the precursor to ultraviolet radiation in the presence of an acid catalyst. The acid catalyst initiates the photoaromatization upon exposure to ultraviolet radiation and forms polyphenylene by aromatizing the cyclohexene rings of the precursor.

Preferably, the acid catalyst is a photoacid initiator. As will be appreciated by those skilled in the art, the terms "photoacid catalyst," "photoacid generator," and "photoacid initiator" are terms used to refer to the group of compounds which produce strong acids upon exposure to electromagnetic radiation. For convenience, these compounds will be referred to as "photoacid catalysts" throughout this specification.

Any of the photoacid catalysts known in the art may be used in accordance with the present invention. Examples of compounds and mixtures which can be used as photoacid catalysts include diazonium, phosphonium, sulfonium and iodonium salts; halogen compounds organometal/organohalogen combinations; benzoin and o-nitrobenzyl esters of strong acids, e.g., toluene sulfonic acid; and N-hydroxy amide and N-hydroxyimide sulfonates as disclosed in U.S. Pat. No. 4,371,605. Also included are aryl naphthoquinonediazide-4-sulfonates. Diaryliodonium or triarylsulfonium salts, generally present in the form of salts with complex metal halides ions such as tetrafluoroborate, hexafluoroantimonate, hexafluoroarsenate, and hexafluorophosphate. Another useful group of photosensitive acid generators include oligomers and polymers comprising anionic groups having an aromatic onium acid photogenerator as the positive counter ion. Examples of such polymers include those described in U.S. Pat. No. 4,661,429, incorporated herein by reference. Preferred photoacid catalysts include iodonium or sulfonium salts, such as diphenyliodonium trifluoromethanesulfonate, triphenylsulfonium trifluoromethanesulfonate, or triphenylsulfonium antimony hexafluoride.

It may be desirable to add a sensitizer to the system to adjust the spectral sensitivity to the available wavelength of radiation. The need will depend upon the requirements of system and the specific photosensitive compound used. For example, iodium and sulfonium salts that respond only to wavelengths below 300 nm may be sensitized to longer wavelengths using benzophenone and derivatives thereof, polycyclic aromatic hydrocarbons such as perylene, pyrene, and anthracene, and derivatives thereof.

The acid catalyst may be added directly to the polymer precursor, added to a solution of the polyphenylene precursor, or added to a mixture of the polyphenylene precursor and other additives, e.g., a sensitizer. Any of the solvents known by those skilled in the art for the polyphenylene precursors may be used, for example, toluene. For convenience of reference, the term "mixture" is used throughout the present application to refer to the addition of the photoacid catalyst to the polyphenylene precursor in any of these forms.

In one embodiment of the invention, the polyphenylene precursor/photoacid catalyst mixture is deposited as a film or a coating of the mixture on a suitable substrate prior to exposure to ultraviolet radiation. Suitable substrates include both metal and non-metal substrates, such as silicon wafers, glass substrates, polymer substrates and ceramic substrates. The mixture may be deposited on the substrate using any of the methods known in the art, for example, by spincoating the mixture onto the surface of the substrate.

The polyphenylene precursor/photoacid catalyst mixture is exposed to ultraviolet radiation to activate the acid catalyst which then photoaromatizes the precursor to form polyphenylene. The aromatization may be activated by irradiating the mixture with ultraviolet light using any of the techniques known in the art for providing radiation in the range of 200 nm to 420 nm ultraviolet radiation. The radiation may be natural or artificial, monochromatic or polychromatic, incoherent or coherent and should be sufficiently intense to activate a substantial portion of the photoacid generator and thus initiate the photoaromatization. Conventional light sources include fluorescent lamps, mercury, metal additive and arc lamps. Coherent light sources are the pulsed nitrogen, xenon, argon ion- and ionized neon lasers whose emissions fall within or overlap the ultraviolet or visible absorption bands of the photoacid catalyst. In one embodiment of the invention, the polyphenylene precursor/photoacid catalyst mixture is exposed to deep-ultraviolet radiation having a wavelength of about 235 to 260 nanometers.

Preferably, the process of the present invention is carried out at a temperature above the glass transition temperature of the poly(1,2-disubstituted-cyclohexa-3,5-diene) but below the decomposition temperature of the photoacid catalyst. Thus, as will be appreciated by those skilled in the art, the specific temperature used will depend upon the particular polymer precursor and the photoacid catalyst used. For example, temperatures from about 90° C. to about 160° C. can be used to aromatize 1,2-dicarbethoxycyclohexa-3,5-diene or 1,2-diacetatecyclohexa-3,5-diene using the photoacid catalyst triphenylsulfonium antimony hexafluoride.

The acid catalyst is added to the polyphenylene precursor in an amount of about 0.01 to 20 parts by weight per 100 parts by weight polyphenylene precursor, and preferably about 1 to about 10 parts by weight polyphenylene precursor.

In alternative embodiments of the present invention, at least one comonomer is copolymerized with the polyphenylene precursor prior to aromatization of the precursor. The term "comonomer" refers to a compound which can be reacted under polymerization conditions with a 1,2-disubstituted-cyclohexa-3,5-diene which has 1,2-substituents as herein defined to form a copolymer therewith. Examples of suitable comonomers, the residues of which may be present in copolymers of the Formulas I and II above, include those monomers which are radically polymerizable, including vinyl monomers, i.e., olefinic hydrocarbons, e.g., styrene, substituted styrenic compounds and ethylene, acrylates, methacrylates, acrylamides, methacrylamides, maleimides, vinyl halides, vinyl esters, acrylonitrile and tetrafluoroethylene; and compounds such as carbon monoxide, carbon dioxide and sulfur dioxide. The copolymer polyphenylene precursors according to Formula (II) are known to those skilled in the art and are also described U.S. Pat. No. 4,798,742 and European Publication Nos. 76605 and 107,895, the disclosures of which are incorporated entirely herein by reference. The photoaromatization of the copolymers may be carried out under conditions similar to those given above.

The resultant polyphenylene polymer or copolymer prepared according to the present invention may be in a variety of forms, but preferably is in the form of a substantially continuous two-dimensional solid, e.g., a film or coating. When the polymer of the invention is a substantially continuous two-dimensional solid, it may be in the form of a self-supporting layer, e.g., a film, a planarizing layer, an encapsulating layer, an optical waveguide, and the like, on any of the substrates discussed above to provide a microelectronic device.

The following examples are provided to further illustrate the present invention. These examples are illustrative of the invention and should not be construed as limiting thereof.

EXAMPLE 1

Synthesis and Polymerization of Cyclohexadiene-1,2-diol Derivatives

Materials

Acetyl chloride, methyl chloroformate, ethyl chloroformate, isobutyl chloroformate (Aldrich), and 3,5-cis-cyclohexadiene-1,2-diol (Sigma) were used as received. Azobis(isobutyronitrile) (AIBN) was recrystallized from ethanol. Pyridine was distilled over sodium hydroxide (NaOH). Other chemicals were used as received.

Monomer Synthesis and Polymerization

Monomer synthesis and polymerization were carried out with AIBN to yield polyphenylene precursors, as described in D. R. McKean et al., *Macromolecules,* 20:1787 (1987) and D. G. H. Ballard et al., *Macromole-* cules, 21:294 (1988). In a similar manner, copolymerization of diacetate monomer with iso-butyl carbonate monomer was carried out with AIBN at 60° C. for 48 hours. Precursors were characterized by standard techniques including gel permeation chromatography, infrared (IR) and ultraviolet (UV) spectroscopy, nuclear magnetic resonance (NMR) and thermal analysis.

Diacetate and alkylcarbonate precursors were synthesized as polyphenylene precursors because their structures have many similarities to t-BOC polystyrene (6) or poly(α-acetoxystyrene). See, e.g., H. Ito et al., *Macromolecules*, 23:2885 (1990). The results were summarized in Table 1.

TABLE 1

Radical Polymerization of Diacetate Monomer ($M_1$), Diethylcarbonate Monomer ($M_2$), and Isobutylcarbonate Monomer ($M_3$) by AIBN at 60° C.

| monomer | diacetate monomer ($M_1$) | Et-carbonate monomer ($M_2$) | i-Bu-carbonate monomer ($M_3$) | $M_1 + M_3$ |
|---|---|---|---|---|
| yield, % | 60.0 | 55.0 | >95.0 | 30.0 |
| $m_1/m_3$* | — | — | — | 1/4 |
| $M_n$** × $10^{-3}$ | 35 | 20.2 | <0.3 | 7.3 |
| $M_w/M_n$ | 1.84 | 1.94 | — | 1.64 |

†: copolymerization of an equimolar amount of comonomer $M_1+M_2$ with AIBN at 60° C. for 2 days.
*copolymer composition was determined by $^1$H NMR.
**molecular weights based on polystyrene standards.

Diacetate monomer ($M_1$) and diethylcarbonate monomer ($M_2$) polymerized very easily to produce homopolymer precursors. The yield of homopolymers was gravimetrically calculated and was in the range of 55 to 60%. Molecular weights ($M_n$) based on polystyrene standard ranged from 20,000 to 40,000 g/mol with relatively low polydispersities ($M_w/M_n$<2.0). Polymerization of di-i-butylcarbonate monomer ($M_3$) with AIBN at 60° C. yielded no polymer by gel permeation chromatography (GPC). The final product was analyzed by proton ($^1$H) NMR and indicated that the final product was benzene iso-butylcarbonate. This result indicated that this monomer ($M_3$) was quite unstable and suggested that it had difficulty in polymerizing due to the steric hindrance between iso-butyl carbonate groups. Iso-butylcarbonate benzene can be formed by thermal decarboxylation through a six-membered ring intermediate. The same monomer ($M_3$) however copolymerized with diacetate monomer ($M_1$) very easily. The yield of copolymer I was 30% with the number average molecular weight ($M_n$)=7,300 g/mol with a polydispersity ($M_w/M_n$)=1.6.

EXAMPLE 2

Thermal Conversion of Precursors into Polyphenylene

For comparative purposes, the precursors prepared as described above were converted to polyphenylene using a thermal conversion process. A solution was prepared by dissolving polyphenylene precursor (0.2 g) into toluene (1.0 g). The solution was filtered through a 0.5-mm Teflon filter and then spin coated on various types of substrates such as an NaCl disc for IR analysis, or a quartz wafer for UV analysis at 1000 rpm for 30 seconds. The films were annealed at 300° C. for various times. The final films were analyzed by IR or UV spectroscopy.

The thermal processes were monitored by thermogravimetric analysis (TGA), IR spectroscopy, and UV spectroscopy. The TGA analysis of diethylcarbonate precursor was consistent with the value expected for the loss of two carbonate groups followed by aromatization. The residue was quite stable for several hours at elevated temperatures. Although the inventors do not wish to be bound by a particular theory, it appears that the reaction probably proceeds via a cyclic transition state, since both the ethylcarbonic acid or the carboxylic acid are good leaving groups. The former group probably decomposes into ethanol and carbon dioxide. Similar TGA results were obtained for both the diacetate and the copolymer precursors.

IR data of the polyphenylene prepared from thermally aromatized diethylcarbonate precursor showed the C—H out-of-plane bending band of the phenyl groups at 812 cm$^{-1}$. Spectra of polyphenylene oligomers show an absorbance between 840 and 800 cm$^{-1}$ for the C—H out-of-plane bending band of the phenyl groups. As the number of consecutive phenylene units increases, this peak shifts to lower wavenumbers and attains a limiting value of 802 cm$^{-1}$ for highly conjugated polymer. When compared with the IR spectra of poly(phenylene) oligomers, the polyphenylene produced in this study consists of approximately six consecutive phenylene units separated by unaromatized sections. These unaromatized sections, the precise structure of which is unknown, are perhaps due to the 1,2-repeat unit structure found in the precursor. Similar IR data were obtained from pyrolysis of diacetate precursors and copolymer precursor.

The typical UV spectrum of the polyphenylene prepared from diethylcarbonate precursor which had been pyrolyzed at 300° C. for 6 hours is shown in FIG. 1. The UV spectrum showed a maximum absorption around 320 nm tailing into the visible region. The UV absorption, like the IR spectrum, depends on the number of the consecutive phenylene rings. The UV absorption increases with increasing number of consecutive phenylene rings and shifts toward 380-390 nm for the highly conjugated polymer. When compared with UV spectra of polyphenylene oligomers, this polyphenylene again has approximately six consecutive phenylene units which is consistent with the value obtained from IR data.

EXAMPLE 3

Acid-catalyzed Photoaromatization of Precursors into Polyphenylene

Polyphenylene in accordance with the process of the invention was prepared as follows. A solution was prepared by dissolving both the diacetate precursor and diethylcarbonate precursors (0.2 g) and triphenylsulfonium antimony hexafluoride (photoacid generator: 10% wt.) into toluene (1.0 g). The solution was filtered through a 0.5-mm Teflon filter and then spin-coated on various types of substrates such as a NaCl disc (for IR measurement) or a quartz wafer (for UV measurement) at 1000 rpm for 30 seconds. The film thickness was measured by a surface profilometer (Tencor Instruments, Alpha Step 200). The films were exposed to a deep-UV source (235-260 nm from high pressure Hg arc lamps) for various times. The final films were analyzed by IR and UV spectroscopy.

Figure 2:
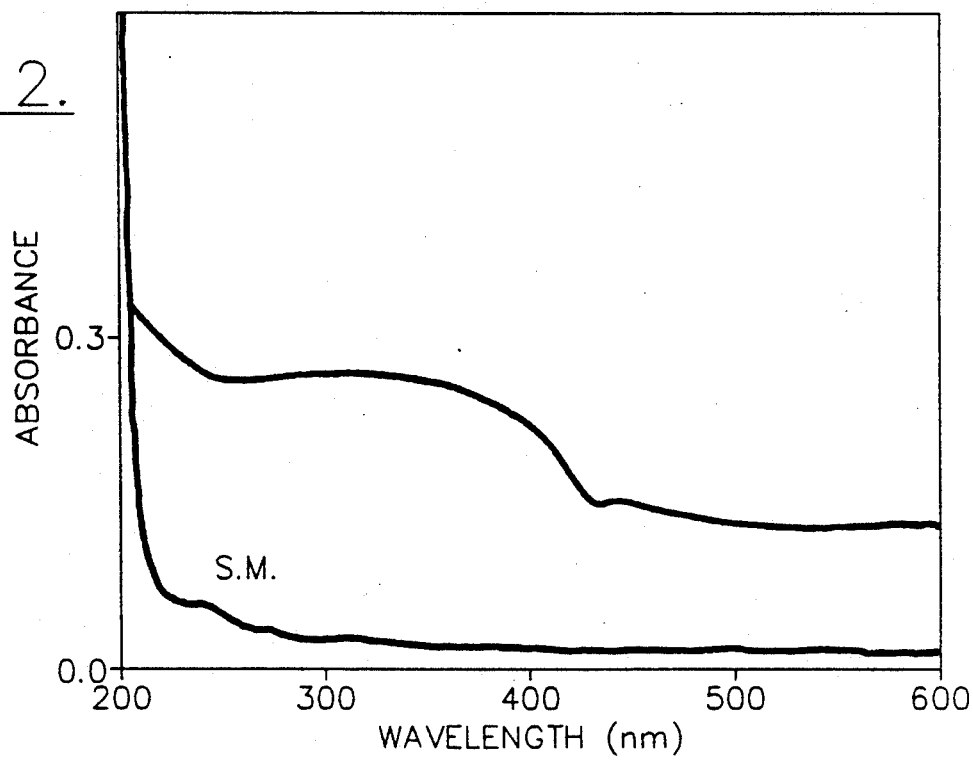
FIG. 2 is an ultraviolet spectrum of diethylcarbonate precursor with a photoacid catalyst as a function of the deep-UV exposure time, (a) 0 mJ/cm$^2$; (b) 18 mJ/cm$^2$; (c) 36 mJ/cm$^2$; and (d) 54 mJ/cm$^2$.

A typical UV spectral change as a function of exposure time is shown in FIG. 2, which illustrates an ultraviolet spectrum of diethylcarbonate precursor with a photoacid generator as a function of the deep-UV exposure time, at (a) 0 mJ/cm$^2$; (b) 18 mJ/cm$^2$; (c) 36 mJ/cm², and (d) 54 mJ/cm². FIG. 2 also showed that the absorption bands shifted to longer wavelength with increasing exposure time. This result indicates that the number of conjugated phenylene rings increased with increasing acid concentration (or exposure time).

Figure 3:
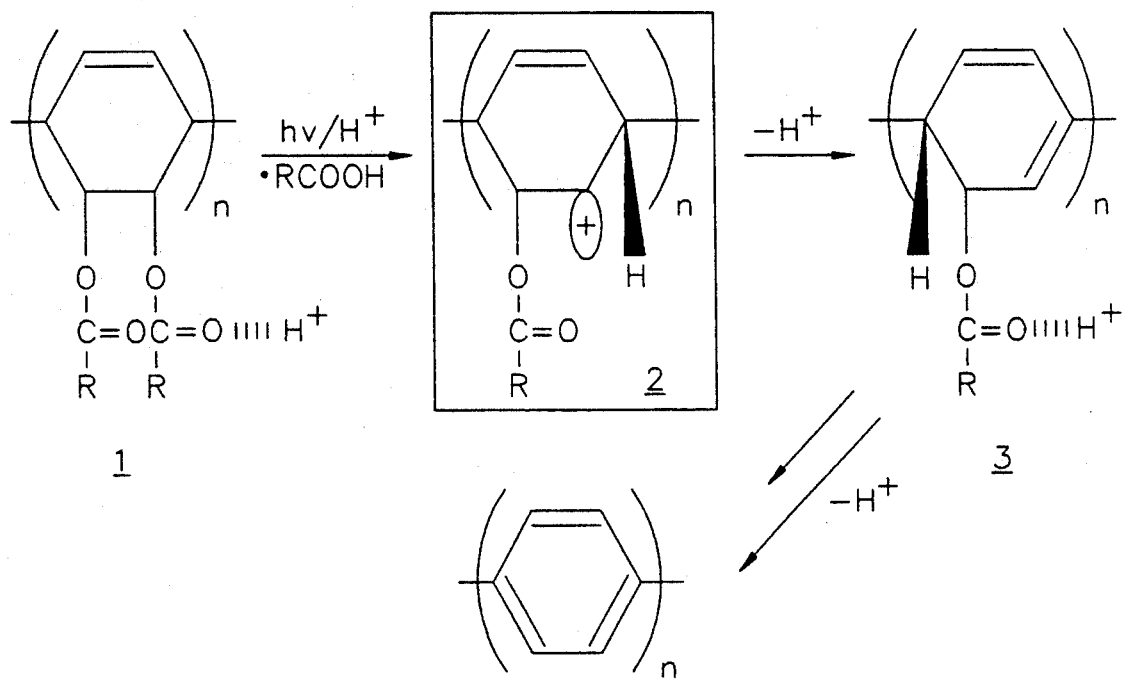
FIG. 3 is a schematic representation of the proposed mechanism of the acid-catalyzed photoaromatization of polyphenylene precursors into polyphenylenes according to the invention.

Although the applicants do not wish to be bound by any particular theory or explanation of the invention, it is believed that the photoaromatization process proceeds through carbocationic moieties, as illustrated in FIG. 3. FIG. 3 shows the El-like elimination which may prevail in the case of the acid-catalyzed photocuring conversion, similar to the acid-catalyzed thermolytic cleavage of polycarbonates or polyesters. The reaction starts with protonation of a carbonyl group in either a carbonate group or an acetate group to afford intermediate 1. This intermediate is then converted by formation of carbocationic moiety 2 and RCOOH. Elimination of a proton from the carbocationic moiety results in regeneration of the acid catalyst and the formation of a diene-containing polymer 3. This process continues to occur on the remaining leaving groups with the eventual formation of polyphenylene. The protons initially produced by UV irradiation are regenerated in the process and explain the chemical amplification of this resist material.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A process for preparing polyphenylene, the process comprising:
    exposing poly(1,2-disubstituted-cyclohexa-3,5-diene) to ultraviolet light in the presence of an acid catalyst to thereby form polyphenylene by aromatizing he cyclohexene rings of the poly(1,2-disubstituted-cyclohexa-3,5-diene).

2. The process according to claim 1 further comprising the step of adding a salt of the acid catalyst to the poly(1,2-disubstituted-cyclohexa-3,5-diene) prior to the step of exposing the poly(1,2-disubstitute-cyclohexa-3,5-diene) to ultraviolet light.

3. The process according to claim 1 wherein the step of exposing poly(1,2-disubstituted-cyclohexa-3,5-diene) to ultraviolet light comprises exposing poly(1,2-disubstituted-cyclohexa-3,5-diene)s in which the 1,2-substituents are esters or carbonates or both.

4. The process according to claim 1 wherein the step of exposing poly(1,2-disubstituted-cyclohexa-3,5-diene) to ultraviolet light comprises exposing poly(1,2-disubstituted-cyclohexa-3,5-diene)s in which the 1,2-substituents are represented by the formula —OR, wherein each R, which may be the same or different, is hydrogen, a lower alkyl group having up to five carbon atoms, an aroyl or alkanoyl group having up to ten carbon atoms, or —COOR' wherein R' is an aryl or alkyl group having up to ten carbon atoms.

5. The process according to claim 1 wherein the step of exposing poly(1,2-disubstituted-cyclohexa-3,5-diene) to ultraviolet light comprises exposing poly(1,2-disubstituted-cyclohexa-3,5-diene)s in which the 1,2-substituents are represented by the formula —OCOOCH₂CH₃ or —OCOCH₃ or both.

6. The process according to claim 1 wherein the step of exposing poly(1,2-disubstituted-cyclohexa-3,5-diene) to ultraviolet light comprises exposing poly(1,2-disubstituted-cyclohexa-3,5-diene)s in which the 1,2-substituents are represented by the formula —OCOCH₃.

7. The process according to claim 1 wherein the step of exposing the poly(1,2-disubstituted-cyclohexa-3,5-diene) comprises exposing 1,2-dicarbethoxycyclohexa-3,5-diene or 1,2-diacetate cyclohexa-3,5-diene.

8. The process according to claim 1 wherein the step of exposing the poly(1,2-disubstituted-cyclohexa-3,5-diene) comprises exposing 1,2-diacetate cyclohexa-3,5-diene.

9. The process according to claim 1 wherein the step of exposing the acid catalyst and the poly(1,2-disubstituted-cyclohexa-3,5-diene) to ultraviolet light comprises exposing the poly(1,2-disubstituted-cyclohexa-3,5-diene) to ultraviolet light wherein the acid catalyst and the poly(1,2-disubstituted-cyclohexa-3,5-diene) are maintained at a temperature above the glass transition temperature of the poly(1,2-disubstituted-cyclohexa-3,5-diene) but below the decomposition temperature of the acid catalyst.

10. The process according to claim 1 wherein the step of exposing the acid catalyst and the poly(1,2-disubstituted-cyclohexa-3,5-diene) to ultraviolet light comprises exposing the poly(1,2-disubstituted-cyclohexa-3,5-diene) to ultraviolet light of a selected frequency and quantity so that the catalyzing acid is formed and then catalyzes the aromatization of the cyclohexene rings of the poly(1,2-disubstituted-cyclohexa-3,5-diene) into polyphenylene.

11. The process according to claim 10 wherein the step of exposing the acid catalyst and the poly(1,2-disubstituted-cyclohexa-3,5-diene) to ultraviolet light comprises exposing the poly(1,2-disubstituted-cyclohexa-3,5-diene) to ultraviolet light having a frequency between about 235 to 260 nm.

12. The process according to claim 1 wherein the step of exposing the acid catalyst and the poly(1,2-disubstituted-cyclohexa-3,5-diene) to ultraviolet light comprises exposing an acid catalyst which generates acid upon exposure to radiation to thereby produce acid-catalyzed aromatization of the cyclohexene rings of the poly(1,2-disubstituted-cyclohexa-3,5-diene) into polyphenylene.

13. The process according to claim 1 wherein the step of exposing the acid catalyst and the poly(1,2-disubstituted-cyclohexa-3,5-diene) to ultraviolet light comprises exposing an acid catalyst selected from the group consisting of diazonium, phosphonium, sulfonium and iodonium salts; halocarbons; benzoin and o-nitrobenzyl esters of strong acids; toluene sulfonic acid; N-hydroxy amide and N-hydroxyimide sulfonates; and aryldiazonium, diaryliodonium and triarylsulfonium metal halides.

14. A process for preparing polyphenylene, the process comprising:
    exposing poly(1,2-disubstituted-cyclohexa-3,5-diene) and the salt of a catalyzing acid to ultraviolet light in which the salt is of the type that will form its acid upon exposure to ultraviolet light to thereby form the catalyzing acid and then form polyphenylene when the acid catalyzes the ultraviolet exposure aromatizing of the cyclohexene rings of the poly(1,2-disubstituted-cyclohexa-3,5-diene) into polyphenylene.

15. The process according to claim 14 wherein the step of exposing poly(1,2-disubstituted-cyclohexa-3,5-diene) to ultraviolet light comprises exposing poly(1,2- disubstituted-cyclohexa-3,5-diene)s in which the 1,2-substituents are esters or carbonates or both.

16. The process according to claim 14 wherein the step of exposing poly(1,2-disubstituted-cyclohexa-3,5-diene) to ultraviolet light comprises exposing poly(1,2-disubstituted-cyclohexa-3,5-diene)s in which the 1,2-substituents are represented by the formula -OR, wherein each R, which may be the same or different, is hydrogen, a lower alkyl group having up to five carbon atoms, an aroyl or alkanoyl group having up to ten carbon atoms, or —COOR' wherein R' is an aryl or alkyl group having up to ten carbon atoms.

17. The process according to claim 14 wherein the step of exposing poly(1,2-disubstituted-cyclohexa-3,5-diene) to ultraviolet light comprises exposing poly(1,2-disubstituted-cyclohexa-3,5-diene)s in which the 1,2-substituents are represented by the formula —O-COCH$_3$.

18. The process according to claim 14 wherein the step of exposing the poly(1,2-disubstituted-cyclohexa-3,5-diene) comprises exposing 1,2-diacetatecyclohexa-3,5-diene.

19. The process according to claim 14 wherein the step of exposing the acid catalyst and the poly(1,2-disubstituted-cyclohexa-3,5-diene) to ultraviolet light comprises exposing the poly(1,2-disubstituted-cyclohexa-3,5-diene) to ultraviolet light wherein the acid catalyst and the poly(1,2-disubstituted-cyclohexa-3,5-diene) are maintained at a temperature above the glass transition temperature of the poly(1,2-disubstituted-cyclohexa-3,5-diene) but below the decomposition temperature of the acid catalyst.

20. The process according to claim 14 wherein the step of exposing the acid catalyst and the poly(1,2-disubstituted-cyclohexa-3,5-diene) to ultraviolet light comprises exposing the poly(1,2-disubstituted-cyclohexa-3,5-diene) to ultraviolet light of selected frequency and quantity so that the catalyzing acid is formed and then catalyzes the aromatization of the cyclohexene rings of the poly(1,2-disubstituted-cyclohexa-3,5-diene) into polyphenylene.

21. The process according to claim 20 wherein the step of exposing the acid catalyst and the poly(1,2-disubstituted-cyclohexa-3,5-diene) to ultraviolet light comprises exposing the poly(1,2-disubstituted-cyclohexa-3,5-diene) to ultraviolet light having a frequency between about 235 to 260 nm.

22. The process according to claim 20 wherein the step of exposing the acid catalyst and the poly(1,2-disubstituted-cyclohexa-3,5-diene) to ultraviolet light comprising exposing an acid catalyst which generates acid upon exposure to radiation to thereby produce acid-catalyzed aromatization of the cyclohexene rings of the poly(1,2-disubstituted-cyclohexa-3,5-diene) into polyphenylene.

23. The process according to claim 14 wherein the step of exposing the acid catalyst and the poly(1,2-disubstituted-cyclohexa-3,5-diene) to ultraviolet light comprises exposing an acid catalyst selected from the group consisting of diazonium, phosphonium, sulfonium and iodonium salts; halocarbons; benzoin and o-nitrobenzyl esters of strong acids; toluene sulfonic acid; N-hydroxy amide and N-hydroxyimide sulfonates; and aryldiazonium, diaryliodonium and triarylsulfonium metal halides.

24. A process for preparing polyphenylene, the process comprising exposing a poly(1,2-disubstituted-cyclohexa-3,5-diene) to ultraviolet light in the presence of an acid catalyst to thereby form polyphenylene by aromatizing the cyclohexene rings of the poly(1,2-disubstituted-cyclohexa-3,5-diene), wherein the poly(1,2-disubstituted-cyclohexa-3,5-diene) is represented by the formula:

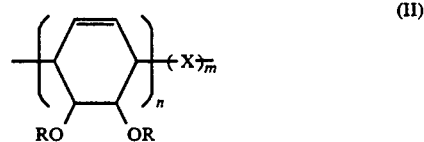

wherein
the cyclohexenylene ring and the residue X, where X is present, may vary from unit to unit along the polymer chain;
each R, which may be the same or different, is hydrogen, a lower alkyl group having up to five carbon atoms, an aroyl or alkanoyl group having up to ten carbon atoms or —COOR' wherein R' is an aryl or alkyl group having up to ten carbon atoms;
X is a residue of one or more polymerizable comonomers as hereinafter defined; and
n and m are integers and the ratio of n:m lies in the range of 1:0 to 1:100.

25. A chemical composition suitable as a polyphenylene precursor comprising a mixture of an acid catalyst and poly(1,2-disubstituted-cyclohexa-3,5-diene), wherein said mixture upon exposure to ultraviolet light forms polyphenylene by aromatizing the cyclohexene rings of the poly(1,2-disubstituted-cyclohexa-3,5-diene).

26. The chemical composition according to claim 25 wherein the acid catalyst is selected from the group consisting of acid salts which generate acid upon exposure to radiation to thereby produce the acid-catalyzed aromatization of the cyclohexene rings of the poly(1,2-disubstituted-cyclohexa-3,5-diene) into polyphenylene.

27. The chemical composition according to claim 25 wherein the acid catalyst is selected from the group consisting of diazonium, phosphonium, sulfonium and iodonium salts; halocarbons; benzoin and o-nitrobenzyl esters of strong acids; toluene sulfonic acid; N-hydroxy amide and N-hydroxyimide sulfonates; and aryldiazonium, diaryliodonium and triarylsulfonium metal halides.

28. The chemical composition according to claim 25 wherein the poly(1,2-disubstituted-cyclohexa-3,5-diene) is 1,2-diacetatecyclohexa-3,5-diene.

* * * * *